UNITED STATES PATENT OFFICE.

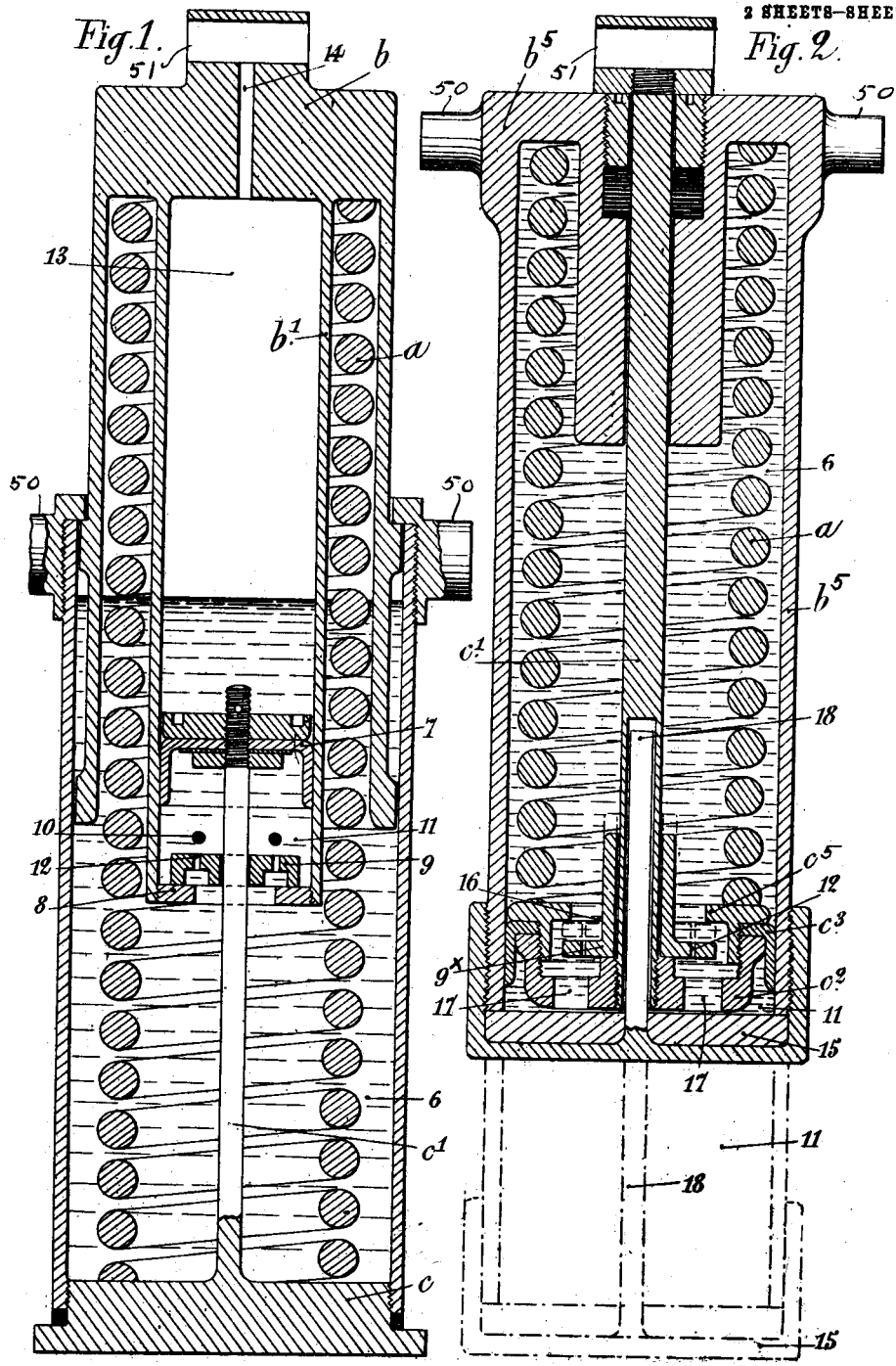

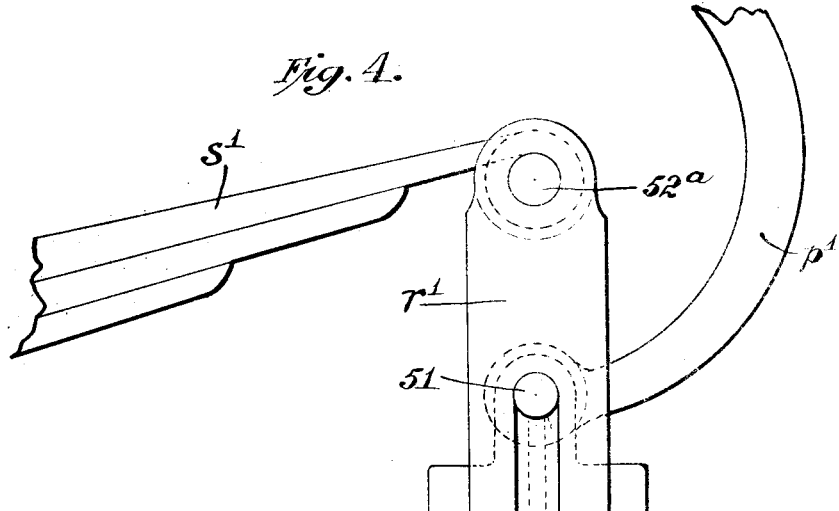
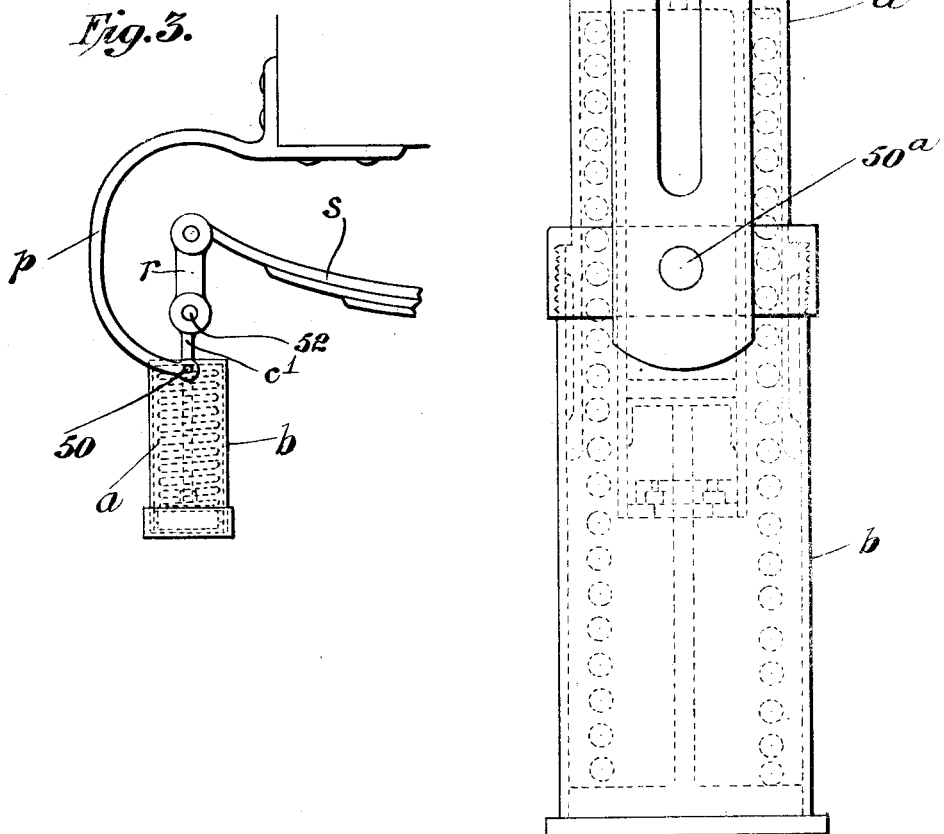

EMILE RIMAILHO, OF NEUILLY-SUR-SEINE, FRANCE, ASSIGNOR TO SOCIÉTÉ ANONYME DES SUSPENSIONS ET ROUES FLEXIBLES, OF PARIS, FRANCE.

SHOCK-ABSORBING DEVICE.

1,033,348. Specification of Letters Patent. Patented July 23, 1912.

Original application filed December 30, 1909, Serial No. 535,673. Divided and this application filed October 6, 1910. Serial No. 585,565.

*To all whom it may concern:*

Be it known that I, EMILE RIMAILHO, a citizen of the Republic of France, residing at Neuilly-sur-Seine, France, have invented certain new and useful Improvements in Shock-Absorbing Devices, of which the following is a specification.

This invention relates to hydraulic braking devices. It has been proposed to employ such devices to act as a means for the automatic closing of a door, and it is the object of the present invention to arrange such an apparatus in such a way as to form a special irreversible shock-absorbing device or buffer, for use in the elastic suspension of motor cars and other vehicles, and designed to be placed preferably between the framing of the vehicle and the end of the usual suspension spring.

The invention consists of an irreversible elastic buffer in which one of the two interfitting supports forms a container for liquid and carries a pump barrel, a sleeve or socket, or a piston, while the other support carries the corresponding complementary element, piston or sleeve or socket, the bottom of the sleeve and the head of the piston when at rest, being immersed in the liquid in the container, so that upon compression of the spring, the relative movement of the piston and the bottom of the sleeve or socket away from each other, forms at the bottom of the latter a chamber which is freely filled with the liquid taken from the container through a valve, while the expansion of the spring is impeded by the imprisonment of the liquid in the said chamber and its slow return through a narrower orifice to the mass of liquid in the container, braking being thus effected without any tendency to force the liquid out of the apparatus.

The present application is a division of my application for patent filed December 30th, 1909, Serial Number 535,673, and the form of invention herein shown described and claimed is that wherein a fluid is employed as the means for braking the recoil movement of the shock absorbing element used in shock absorbing devices.

In the accompanying drawing, wherein the preferred embodiment of my invention is illustrated Figure 1 is a vertical sectional view of a shock absorber constructed according to my invention; Fig. 2 is a similar view of a modified form thereof; and Fig. 3 illustrates the application of the modified form of the invention to a vehicle; and Fig. 4 illustrates the application of the form of invention shown in Fig. 1 to a vehicle.

In both forms of the invention the structure includes a pair of suitable supports, a compression spring $a$, and a braking element such as a quantity of liquid 6 which acts to impede the recoil of the spring $a$.

In the form shown by Fig. 1, the support $b$, carries a pump body $b^1$ the other support $c$, formed by a cylinder filled with liquid 6, carries a rod $c^1$ surmounted by a piston 7, having the usual cupped leather or made in segments, on which slides the pump body $b^1$. The latter terminates in a disk 8 forming a seat for a flap-valve 9, whose lifting movement is limited by stops 10 carried by the pump body. In the position of rest shown in Fig. 1, the piston 7 is normally at a small distance from the bottom 8 of the pump body and the level of the liquid is such that it covers the piston. When, on account of a compression of the spring $a$, due to shocks imparted to the vehicle, the pump body $b^1$ descends with respect to the fixed piston 7, the flap-valve 9 lifts slightly and a quantity of liquid which is greater as the compression of the spring is greater, finds its way freely into the chamber 11 of variable volume limited between the underside of the piston 7 and the upper side of the disk 8. As soon as a recoil movement of the spring tends to be produced, the flap-valve 9 is brought back to its seat 8 by the movement of the liquid so that the latter introduced into the chamber 11 is imprisoned therein. Its escape is possible only through the narrow orifices 12 provided in the flap-valve or the walls and thus the recoil movement of the spring $a$ is impeded. The pressure however which is produced in the mass of liquid thus imprisoned, is localized in this mass, without the remainder of the liquid in which the pump body is immersed being caused to leave the apparatus. The movements of the liquid are produced in the center of the total mass of liquid between the chamber 11 and the container, and a part of the air contained in the upper chamber 13 of the pump body may, upon compression of the spring, escape outside through a passage 14.

In the form of invention illustrated in

Fig. 2, the support $b^6$ forms the pump body hermetically closed by the plug 15 and is completely filled with liquid 6. The other support $c^5$ is constituted by an element of a piston $c^2$ mounted on a suspension rod $c^1$, a cup-leather $c^3$ or segments being packed between $c^5$ and $c^2$. The rod $c^1$ slides in the pump body $b^5$. The support $c^5$ is pierced with a central hole 16 closed or uncovered by a flap-valve $9^x$, according to the direction of movement.

When, owing to the compression of the spring $a$, due to shocks imparted to the vehicle, the pump body $b^5$ descends with respect to the suspension rod $c^1$ which is supposed to be fixed the bottom 15 of the pump body moves away from the piston $c^2$, the flap-valve $9^x$ remains down, and the liquid rushes under the piston $c^2$ through the orifices 17. As soon as a recoil tends to be produced, the flap-valve $9^x$ rises and closes the orifices 16, and the liquid thus transferred under the piston is imprisoned in the chamber 11 between the said piston and the bottom 15, the members occupying the positions indicated in chain-dotted lines. Since the liquid can only pass above the piston again through the narrow orifices 12, the recoil movement is retarded. The pressure, however, which is produced in the imprisoned liquid is not transmitted to the liquid placed above the piston and nothing tends to cause the liquid to leave the apparatus. The volume produced under the piston being equal to that above it, plus the volume corresponding to that of the rod $c^1$, in order to reduce this difference, it will be sufficient to make the rod $c^1$ hollow and to provide the bottom 15 at the center with a counter-rod 18 sliding in the said hollow rod.

Fig. 3 shows the application of the form of invention disclosed in Fig. 2 to a vehicle and it will be noted that the arm $p$ which is fixed to the vehicle frame engages trunnions 50 formed on the casing $b^5$. The vehicle spring $s$ pivotally supports a spring link $r$ to which is pivotally attached at 52 the rod $c^1$ of the shock absorbing device.

In Fig. 4, where the application of the device shown in Fig. 1 to a vehicle is disclosed, the arm $p^1$ is connected by means of a bolt 51 with the part of the support $b$, while the vehicle spring $s^1$ is pivotally connected by means of a bolt $52^a$ with the spring link $r^1$, the other end of the spring link being connected to the trunnions $50^a$ carried by the support $c$.

The invention has herein been described in connection with vehicles, but it is to be understood that its use is not so limited and that it may be used for numerous other purposes, such for example as an elastic seat, or between an ordinary seat and its supporting legs.

Having thus described my invention, what I claim as new and desire to secure by Letters Patent is:—

1. In a shock absorber for vehicles, the combination of a pair of relatively reciprocable supports having an inner chamber containing a body of liquid, a shock absorbing medium extending the entire interior length of said supports, said medium being adapted to return the supports to initial position after movement of the same toward each other, a piston within said chamber, a partition within said chamber spaced from the piston, said partition having a port therein and forming with the piston two walls of an auxiliary chamber, and a valve loose in said auxiliary chamber and adapted to be operated solely by the action of said liquid.

2. In a shock absorber for vehicles, the combination of a pair of relatively reciprocable supports having an inner chamber containing a body of liquid, a coiled spring having its ends abutting the inner end faces of said supports, a piston within said chamber, a partition within said chamber spaced from the piston and forming with the latter an auxiliary chamber adapted to contain a volume of liquid less than the whole body contained in the said inner chamber, a port in said partition through which liquid is adapted to pass from the said inner chamber into the auxiliary chamber, and a valve loose in said auxiliary chamber and adapted to be operated solely by the action of said liquid, said valve having constricted passages therethrough through which liquid is adapted to pass from the auxiliary chamber into the said inner chamber.

3. In an irreversible elastic buffer adapted for attachment in vertical position to the suspension springs of vehicles, the combination of a metal spring, a pair of interfitting supports adapted to have relative movement and inclosing said spring, one of said supports containing a body of liquid, a pump barrel carried by one of said supports and a piston by the other whereby when said parts are at rest the bottom of the barrel and the head of the piston are immersed in the liquid, and a freely movable valve arranged in proximity to said piston, said valve having relatively narrow outlet orifices, whereby upon compression of said spring the relative movement of said piston and the bottom of said barrel away from each other forms a chamber at the bottom of said barrel into which liquid passes freely from the body of liquid in one of said supports, and the expansion of said spring is impeded by the slow passage of liquid out of said chamber through the narrow orifices in the valve.

4. In an irreversible elastic buffer adapted for attachment to the suspension springs of vehicles, the combination of a coiled metal spring, a pair of vertically arranged interfitting supports adapted to have relative movement and inclosing said spring, one of said supports containing a body of liquid, a pump barrel carried by one of said supports and a piston carried by the other support and being normally near the bottom of the support containing the liquid whereby when the said parts are at rest the bottom of the barrel and the head of the piston are immersed in the liquid there being an opening of substantial area to admit liquid under said piston, and a valve freely movable by the liquid in the container, said valve having relatively narrow outlet orifices therein whereby upon compression of said spring the relative movement of the piston and the bottom of the barrel forms a chamber of variable proportions into which liquid passes through said opening of substantial area, and the expansion of said spring is impeded by trapping liquid in said chamber and the slow passage of said liquid out through the narrow orifices in said valve.

In testimony whereof I have affixed my signature in presence of two witnesses.

EMILE RIMAILHO.

Witnesses:
HENRI MORIN,
H. C. COXE.